(12) United States Patent
Mathur et al.

(10) Patent No.: US 8,642,182 B2
(45) Date of Patent: Feb. 4, 2014

(54) GLOSSING SYSTEM FOR PAPER AND PAPERBOARD COATING

(75) Inventors: Sharad Mathur, Tega Cay, SC (US); David Abundis, Charlotte, NC (US); Randall Furtick, Charlotte, NC (US)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 13/124,341

(22) PCT Filed: Jul. 28, 2010

(86) PCT No.: PCT/US2010/043511
§ 371 (c)(1),
(2), (4) Date: Apr. 14, 2011

(87) PCT Pub. No.: WO2011/014545
PCT Pub. Date: Feb. 3, 2011

(65) Prior Publication Data
US 2012/0135253 A1    May 31, 2012

Related U.S. Application Data

(60) Provisional application No. 61/229,381, filed on Jul. 29, 2009.

(51) Int. Cl.
*B32B 23/04*    (2006.01)

(52) U.S. Cl.
USPC ........................................ 428/532; 428/537.5

(58) Field of Classification Search
USPC ................................................ 428/532, 537.5
See application file for complete search history.

(56) References Cited

U.S. PATENT DOCUMENTS

| | | | | |
|---|---|---|---|---|
| 4,478,974 | A * | 10/1984 | Lee et al. | 524/533 |
| 4,657,821 | A * | 4/1987 | Ura et al. | 428/510 |
| 5,846,381 | A | 12/1998 | Wirth et al. | |
| 6,794,436 | B2 * | 9/2004 | Schlarb et al. | 524/423 |
| 7,081,305 | B2 * | 7/2006 | Distler et al. | 428/514 |
| 7,244,510 | B2 * | 7/2007 | Van Den Abbeele et al. | 428/537.5 |
| 8,236,431 | B2 * | 8/2012 | Mukkamala | 428/537.5 |
| 8,530,574 | B2 * | 9/2013 | Balk et al. | 524/817 |

FOREIGN PATENT DOCUMENTS

| | | | |
|---|---|---|---|
| EP | 0167902 | * | 1/1986 |
| EP | 0167902 A1 | | 1/1986 |

* cited by examiner

*Primary Examiner* — Leszek Kiliman
(74) *Attorney, Agent, or Firm* — Laura C. DiLorenzo

(57) ABSTRACT

This invention is directed to a paper coating or binding formulation, comprising an aqueous emulsion which comprises a copolymer derived from one or more monomers, and an ultra fine kaolin pigment. In certain embodiments, this invention is directed to a blend of high T9 latex (substantially non-film forming) and ultrafine kaolin. This invention is also directed to a paper comprising a fiber matrix and a coating or binding composition comprising an aqueous emulsion which comprises a copolymer deviced from one or more monomers, and an ultrafine kaolin pigment.

20 Claims, No Drawings

GLOSSING SYSTEM FOR PAPER AND PAPERBOARD COATING

FIELD OF THE INVENTION

The invention is related to a blend of an ultrafine kaolin and a substantially poor film forming latex, and the use thereof.

BACKGROUND OF THE INVENTION

High gloss (for example, >65%) attainment in paper coatings typically involves the use of plastic pigments which may be solid or hollow in form. The plastic pigments are "non film forming", i.e., do not coalesce under ambient temperature and those encountered during the drying and finishing (calendaring or super calendaring) of coated paper. Hollow sphere plastic pigment (HSPP) has a core-shell morphology wherein the core is filled with water. During the paper coating drying process, the water in the void may diffuse through the shell and leave air voids. Due to the difference in refractive index between air and surrounding polymer shell, light is effectively scattered, contributing to coating opacity. The use of HSPP in paper coatings lead to improvements in gloss, brightness, and opacity and are considered to be more effective than solid plastic pigment (See, U.S. Pat. No. 6,410,158). In addition, print performance is often improved as a result of elevated sheet gloss, smoothness and opacity. The degree to which the sheet properties are improved is dependent on the particle size and void volume of the HSPP, other mineral pigments used, and the type and amount of finishing utilized. HSPP is used in the range of 2 to 20% by dry weight of pigment depending on the level of gloss desired. The remainder of the pigment portion of the coating is typically made up of inorganic materials such as kaolin, ground calcium carbonate (GCC), talc (minerals), titanium dioxide or precipitated calcium carbonate. The particle size of HSPP is typically in the range of 0.1 to 1.0 micrometers, and the particles are suspended in an aqueous phase and supplied at approximately 25-30% solids by weight.

Because HSPP is a significantly expensive pigment compared with typical mineral pigments used in paper coatings (at least 10 times more expensive than kaolin on a dry basis) and also more expensive than solid latexes (at least 25% more expensive on dry basis), paper manufacturers are always looking for more economically suitable alternatives. It would therefore be an advancement in the art to develop a suitable replacement for HSPP.

SUMMARY OF THE INVENTION

This invention is directed to a paper coating or binding formulation, comprising an aqueous emulsion which comprises a copolymer derived from one or more monomers, and an ultra fine kaolin pigment. In certain embodiments, this invention is directed to a blend of high $T_g$ latex (substantially non-film forming) and ultrafine kaolin.

This invention is also directed to a paper comprising a fiber matrix and a coating or binding composition comprising an aqueous emulsion which comprises a copolymer deviced from one or more monomers, and an ultrafine kaolin pigment.

DETAILED DESCRIPTION OF THE EMBODIMENTS

This invention relates to synergistic use of a high glass transition temperature ("$T_g$") latex and an ultrafine kaolin to replace the HSPP in a coating color formulation, without any adverse impact on runnability and coated sheet properties.

The ultrafine kaolin of this invention has at least 55% of the particles by weight less than 0.3 μm (as measured by the X-ray sedimentation technique using Sedigraph 5100) and finer particle size. In an embodiment, 55% of the particles are by weight less than 0.3 μm. In another embodiment, 70% of the particles are by weight less than 0.3 μm, as it is well known that decreasing the particle size of the pigment improves gloss. However, decreasing particle size also leads to decrease in hiding provided by the coating or sheet opacity and this can potentially be overcome by using bulking chemicals such as polyamine. Ultrafine particle size kaolin pigments, used for their gloss contribution, have been shown to be suitable extenders for HSPP.

The present invention shows that fine particle size kaolin pigments or solid plastic pigments, used for their gloss qualities, may be suitable extenders for HSPP. However, complete replacement of HSPP is possible primarily with using a relatively $T_g$ solid latex ($T_g$>30 deg C.) in combination with an ultrafine kaolin. The high $T_g$ latex is substantially non-film forming under the process conditions encountered to obtain finished paper and paperboard coatings such as application, metering, drying and calendaring of the coating. The high $T_g$ latex is derived from one or more monomers to provide a $T_g$ of >30 deg C. The latex (also referred to as aqueous copolymer emulsion) is synthetically prepared by polymerizing the monomers using free-radical aqueous emulsion polymerization.

Monomers suitable for use in the paper coating or binding formulation can generally be ethylenically unsaturated monomers including, for example, styrene, butadiene, vinyl acetate, carboxylic acids, (meth)acrylic acid esters, (meth) acrylamide, and (meth)acrylonitrile. For example, suitable monomers can include vinylaromatic compounds (e.g., styrene, α-methylstyrene, o-chlorostyrene, and vinyltoluenes); butadiene (i.e., 1,2-butadiene); conjugated dienes (e.g., 1,3-butadiene and isoprene); α,β-monoethylenically unsaturated mono- and dicarboxylic acids or anhydrides thereof (e.g., acrylic acid, methacrylic acid, crotonic acid, dimethacrylic acid, ethylacrylic acid, allylacetic acid, vinylacetic acid maleic acid, fumaric acid, itaconic acid, mesaconic acid, methylenemalonic acid, citraconic acid, maleic anhydride, itaconic anhydride, and methylmalonic anhydride); esters of α,β-monoethylenically unsaturated mono- and dicarboxylic acids having 3 to 6 carbon atoms with alkanols having 1 to 12 carbon atoms (e.g., esters of acrylic acid, methacrylic acid, maleic acid, fumaric acid, or itaconic acid, with C1-C12, C1-C8, or C1-C4 alkanols such as ethyl, n-butyl, isobutyl and 2-ethylhexyl acrylates and methacrylates, dimethyl maleate and n-butyl maleate); acrylamides and alkyl-substituted acrylamides (e.g., (meth)acrylamide, N-tert-butylacrylamide, and N-methyl(meth)acrylamide); (meth)acrylonitrile; vinyl and vinylidene halides (e.g., vinyl chloride and vinylidene chloride); vinyl esters of C1-C18 mono- or dicarboxylic acids (e.g., vinyl acetate, vinyl propionate, vinyl n-butyrate, vinyl laurate and vinyl stearate); C1-C4 hydroxyalkyl esters of C3-C6 mono- or dicarboxylic acids, especially of acrylic acid, methacrylic acid or maleic acid, or their derivatives alkoxylated with from 2 to 50 moles of ethylene oxide, propylene oxide, butylene oxide or mixtures thereof, or esters of these acids with C1-C18 alcohols alkoxylated with from 2 to 50 mol of ethylene oxide, propylene oxide, butylene oxide or mixtures thereof (e.g., hydroxyethyl (meth)acrylate, hydroxypropyl (meth)acrylate, and methylpolyglycol acrylate); and monomers containing glycidyl groups (e.g., glycidyl methacrylate).

Additional monomers suitable for use in the paper coating or binding formulation can include linear 1-olefins, branched-chain 1-olefins or cyclic olefins (e.g., ethene, propene, butene, isobutene, pentene, cyclopentene, hexene, and cyclohexene); vinyl and allyl alkyl ethers having 1 to 40 carbon atoms in the alkyl radical, wherein the alkyl radical can possibly carry further substituents such as a hydroxyl group, an amino or dialkylamino group, or one or more alkoxylated groups (e.g., methyl vinyl ether, ethyl vinyl ether, propyl vinyl ether, isobutyl vinyl ether, 2-ethylhexyl vinyl ether, vinyl cyclohexyl ether, vinyl 4-hydroxybutyl ether, decyl vinyl ether, dodecyl vinyl ether, octadecyl vinyl ether, 2-(diethylamino)ethyl vinyl ether, 2-(di-n-butylamino)ethyl vinyl ether, methyldiglycol vinyl ether, and the corresponding allyl ethers); sulfo-functional monomers (e.g., allylsulfonic acid, methallylsulfonic acid, styrenesulfonate, vinylsulfonic acid, allyloxybenzenesulfonic acid, 2-acrylamido-2-methylpropanesulfonic acid, and their corresponding alkali metal or ammonium salts, sulfopropyl acrylate and sulfopropyl methacrylate); vinylphosphonic acid, dimethyl vinylphosphonate, and other phosphorus monomers; alkylaminoalkyl (meth)acrylates or alkylaminoalkyl(meth)acrylamides or quaternization products thereof (e.g., 2-(N,N-dimethylamino)ethyl (meth)acrylate, 3-(N,N-dimethylamino)propyl (meth)acrylate, 2-(N,N,N-trimethylammonium)ethyl (meth)acrylate chloride, 2-dimethylaminoethyl(meth)acrylamide, 3-dimethylaminopropyl(meth)acrylamide, and 3-trimethylammoniumpropyl(meth)acrylamide chloride); allyl esters of C1-C30 monocarboxylic acids; N-Vinyl compounds (e.g., N-vinylformamide, N-vinyl-N-methylformamide, N-vinylpyrrolidone, N-vinylimidazole, 1-vinyl-2-methylimidazole, 1-vinyl-2-methylimidazoline, N-vinylcaprolactam, vinylcarbazole, 2-vinylpyridine, and 4-vinylpyridine); monomers containing 1,3-diketo groups (e.g., acetoacetoxyethyl(meth)acrylate or diacetonacrylamide; monomers containing urea groups (e.g., ureidoethyl (meth)acrylate, acrylamidoglycolic acid, and methacrylamidoglycolate methyl ether); and monomers containing silyl groups (e.g., trimethoxysilylpropyl methacrylate).

Suitable monomers can also include one or more crosslinkers such as N-alkylolamides of $\alpha,\beta$-monoethylenically unsaturated carboxylic acids having 3 to 10 carbon atoms and esters thereof with alcohols having 1 to 4 carbon atoms (e.g., N-methylolacrylamide and N-methylolmethacrylamide); glyoxal based crosslinkers; monomers containing two vinyl radicals; monomers containing two vinylidene radicals; and monomers containing two alkenyl radicals. Exemplary crosslinking monomers can include diesters of dihydric alcohols with $\alpha,\beta$-monoethylenically unsaturated monocarboxylic acids, of which in turn acrylic acid and methacrylic acid can be employed. Examples of such monomers containing two non-conjugated ethylenically unsaturated double bonds can include alkylene glycol diacrylates and dimethacrylates, such as ethylene glycol diacrylate, 1,3-butylene glycol diacrylate, 1,4-butylene glycol diacrylate and propylene glycol diacrylate, divinylbenzene, vinyl methacrylate, vinyl acrylate, allyl methacrylate, allyl acrylate, diallyl maleate, diallyl fumarate and methylenebisacrylamide. In some embodiments, the crosslinking monomers can include alkylene glycol diacrylates and dimethacrylates, and/or divinylbenzene. The crosslinking monomers when used in the copolymer can be present in an amount of from 0.2 to 5 phm and are considered part of the total amount of monomers used in the copolymer.

In addition to the crosslinking monomers, small amounts (e.g., from 0.01 to 4 phm) of molecular weight regulators, such as tert-dodecyl mercaptan, can be used. Such regulators can be added to the polymerization zone in a mixture with the monomers to be polymerized and are considered part of the total amount of monomers used in the copolymer.

In some embodiments, the monomers can include styrene, $\alpha$-methylstyrene, (meth)acrylic acid, itaconic acid, maleic acid, fumaric acid, crotonic acid, methyl (meth)acrylate, ethyl (meth)acrylate, n-butyl (meth)acrylate, isobutyl (meth)acrylate, tert-butyl (meth)acrylate, 2-ethylhexyl (meth)acrylate, vinyl acetate, butadiene, (meth)acrylamide, (meth)acrylonitrile, hydroxyethyl (meth)acrylate and glycidyl (meth)acrylate.

The copolymer can be a pure acrylic copolymer, a styrene acrylic copolymer, a styrene butadiene copolymer, or a vinyl acrylic copolymer.

In some embodiments, the copolymer can be a pure acrylic copolymer derived from one or more monomers chosen from (meth)acrylic acid, (meth)acrylic acid esters, (meth)acrylamide, and (meth)acrylonitrile. In some embodiments, the copolymer can include from 71 to 99.5 phm of at least one (meth)acrylic acid ester, from 0 to 6 phm of itaconic acid and/or meth(acrylic) acid, from 0 to 3 phm of at least one (meth)acrylamide, from 0 to 20 phm of at least one (meth)acrylonitrile, and from 0 to 5 phm of vinyl triethoxysilane.

In some embodiments, the copolymer can be a copolymer of methyl methacrylate ("MMA") and n-butyl acrylate ("BA"). In some embodiments, the copolymer can include from 25 to 85 phm of MMA, from 20 to 65 phm of BA, from 0 to 6 phm of itaconic and/or (meth)acrylic acid, from 0 to 3 phm of at least one (meth)acrylamide, from 0 to 20 phm of at least one (meth)acrylonitrile, and from 0 to 5 phm of vinyl triethoxysilane.

In some embodiments, the copolymer can be a copolymer of MMA and 2-ethyl hexyl acrylate ("2-EHA"). In some embodiments, the copolymer can include from 25 to 85 phm of MMA, from 20 to 65 phm of 2-EHA, from 0 to 6 phm of itaconic and/or (meth)acrylic acid, from 0 to 3 phm of at least one (meth)acrylamide, from 0 to 20 phm of at least one (meth)acrylonitrile, and from 0 to 5 phm of vinyl triethoxysilane.

In some embodiments, the copolymer can be a copolymer of 2-EHA and BA. In some embodiments, the copolymer can include from 20 to 65 phm of 2-EHA, from 20 to 65 phm of BA, from 0 to 6 phm of itaconic and/or (meth)acrylic acid, from 0 to 3 phm of at least one (meth)acrylamide, from 0 to 20 phm of at least one (meth)acrylonitrile, and from 0 to 5 phm of vinyl triethoxysilane.

In some embodiments, the copolymer can be a styrene acrylic copolymer derived from monomers including styrene, (meth)acrylic acid, (meth)acrylic acid esters, (meth)acrylamide, (meth)acrylonitrile, and mixtures thereof. For example, the styrene acrylic copolymer can include styrene and at least one of (meth)acrylic acid, itaconic acid, methyl (meth)acrylate, ethyl (meth)acrylate, n-butyl (meth)acrylate, isobutyl (meth)acrylate, tert-butyl (meth)acrylate, 2-ethylhexyl (meth)acrylate, (meth)acrylamide, (meth)acrylonitrile, and hydroxyethyl (meth)acrylate. The styrene acrylic copolymer can include from 24 to 87 phm of (meth)acrylates, from 18 to 81 phm of styrene, from 0 to 2 phm of (meth)acrylamide, and from 0 to 20 phm of (meth)acrylonitrile. The styrene acrylic copolymer can also include from 0 to 3 phm of one or more crosslinking monomers as described above such as alkylene glycol diacrylates and dimethacrylates.

In some embodiments, the copolymer can be a styrene butadiene copolymer derived from monomers including styrene, butadiene, (meth)acrylamide, (meth)acrylonitrile, itaconic acid and (meth)acrylic acid. The styrene butadiene copolymer can include from 25 to 95 phm of styrene, from 15 to 90 phm of butadiene, from 0 to 6 phm of itaconic and/or (meth)acrylic acid, from 0 to 2 phm of (meth)acrylamide, and from 0 to 20 phm of (meth)acrylonitrile. The styrene butadiene copolymer can also include from 0 to 3 phm of one or more crosslinking monomers as described above such as divinylbenzene.

In some embodiments, the copolymer can be a vinyl acrylic copolymer derived from monomers including vinyl acetate, (meth)acrylic acid, (meth)acrylic acid esters, (meth)acrylamide, (meth)acrylonitrile, and mixtures thereof. For example, the vinyl acrylic copolymer can include vinyl acetate and at least one of (meth)acrylic acid, itaconic acid, methyl (meth)acrylate, ethyl (meth)acrylate, n-butyl (meth)acrylate, isobutyl (meth)acrylate, tert-butyl (meth)acrylate, 2-ethylhexyl (meth)acrylate, (meth)acrylamide, (meth)acrylonitrile, and hydroxyethyl (meth)acrylate. The vinyl acrylic copolymer can include from 24 to 87 phm of (meth)acrylates, from 18 to 81 phm of vinyl acetate, from 0 to 2 phm of (meth)acrylamide, and from 0 to 20 phm of (meth)acrylonitrile. The vinyl acrylic copolymer can also include from 0 to 3 phm of one or more crosslinking monomers as described above such as alkylene glycol diacrylates and dimethacrylates.

The monomers and the amounts that the monomers are used to form the copolymer are selected to provide a $T_g$ of the copolymer >30 deg C. to facilitate gloss development and outside of the typical Tg range of −10 deg C. to 25 deg C. of a copolymer that serves as a binder in the paper coating. The choice of the monomers used in the copolymer may also be driven by economic concerns, for example, to decrease the cost of producing the paper coating or binding formulation. The choice of the monomers may also be driven by the characteristics of the monomers and the requirements of the end applications, for example, to resist water and/or light.

The product designated as Styronal ND811 (BASF Corporation), is a carboxylated styrene/butadiene copolymer dispersion useful as a gloss additive for paper and paperboard coatings. It has a solids content of about 50% (allows for improved coating color solids over hollow sphere plastic pigment and thus lower coating drying costs) and a $T_g$ of 56° C. On its own it is unlikely to match the gloss imparted by the HSPP (see, U.S. Pat. No. 6,410,158; Example 2).

Surprisingly, as the following examples show, replacement of hollow sphere plastic pigment by a combination of the nanosized kaolin pigment and the high $T_g$ latex is possible and would provide a substantial economic advantage to the paper mill without impact on their existing infrastructure. The ultrafine kaolin replaces the standard kaolin and the high $T_g$ latex replaces the plastic pigment in the formulation or the blend of ultrafine kaolin and high $T_9$ latex can be used.

EXAMPLE 1

Styronal ND 811 by itself does not provide the gloss achieved with the hollow sphere plastic pigment.

Table 1 shows the formulation with the hollow sphere plastic pigment was subjected to one change—replacement of the pigment (Sample 4) with the high $T_9$ latex Styronal ND811 (Sample 7).

TABLE 1

| Coating Formulation | | |
| --- | --- | --- |
| Sample # | 4 | 7 |
| High Bright # 1 Kaolin | 40 | 40 |
| GCC | 60 | 60 |

TABLE 1-continued

| Coating Formulation | | |
| --- | --- | --- |
| Sample # | 4 | 7 |
| Dispersant | 0.19 | 0.19 |
| SB Latex | 9.0 | 9.0 |
| Starch | 7.0 | 7.0 |
| Calcium stearate | 1.0 | 1.0 |
| Hollow sphere PP | 5.0 | |
| Styronal ND 811 | | 5.0 |

The formulation was made at 59% solids and pH 8.0. It was applied to LWC groundwood basepaper using the Modern Metalcraft coater. The coated paper was dried, cut into sheets and calendared (2 nips, 250 F roll temperature and 500 pli pressure) to target gloss of 65% using standard procedures known to the skilled artisan.

TABLE 2

| Formulation viscosity and the coated paper properties. | | |
| --- | --- | --- |
| Sample # | 4 | 7 |
| Sample Description | HSPP | ND811 |
| Brookfield Viscosity (cps) 20 rpm | 7400 | 5500 |
| Brookfield Viscosity (cps) 100 rpm | 2480 | 1814 |
| Hercules Viscosity | 58 | 43 |
| AA-GWR (g/m$^2$) (2 atm, 2 min.) | 45 | 48 |
| Sheet Gloss 75° (%) | 63 | 61 |
| IGT Dry Pick (ft/min) | 134 | 138 |

Clearly, the ND811 does not achieve the gloss target.

EXAMPLE 2

Table 3 shows that an ultrafine kaolin product, M07-1061, when used as a replacement of the #1 High Brightness kaolin pigment, leads to a significant decrease (2 parts from 5 parts) in the plastic pigment while achieving the gloss target under the same calendaring conditions. The formulation and the coating color viscosity, solids and target coat weight and gloss are shown in Table 3.

TABLE 3

| Coating Formulation CO2007-0238 | | |
| --- | --- | --- |
| Sample # | 1 | 5 |
| High bright # 1 Kaolin | 40 | |
| M07-1061 | | 40 |
| GCC | 60 | 60 |
| Dispersant | 0.2 | 0.2 |
| SB Latex | 9.5 | 9.5 |
| Starch | 6.5 | 6.5 |
| Calcium Stearate | 1.0 | 1.0 |
| Sphere PP | 5.0 | 2.0 |
| Solids as is (%) | 59 | 59 |
| pH as is | 8.0 | 8.0 |
| Vicsocty 1000-1400 # 6 spindle (rpm) | 100 | 100 |

The coating color was applied to base paper using the Modern Metalcraft coater. The coated paper was dried, cut into sheets and calendared to target gloss of 65% using standard procedures. Table 4 shows the coated paper properties.

TABLE 4

Paper Properties

| Sample # | 1 | 5 |
|---|---|---|
| Sample Key | # 1 Kaolin | M07-1061 |
| Sample Description | HSPP - 5 parts | HSPP - 2 parts |
| Sheet Gloss 75° (%) | 66 | 66 |
| Brightness (%) | 77.2 | 77.0 |
| IGT Dry Pick (ft/min) | 142 | 130 |

The substitution of the product designated as M07-1061 for the #1 High Brightness kaolin pigment and decrease in plastic pigment content to 2 parts from 5 parts resulted in same gloss without loss in sheet brightness.

EXAMPLE 3

Example 3 shows that the combination of the BASF products designated as ND811 (latex) and M07-1061 (kaolin) would replace the plastic pigment completely with improvement in sheet gloss and without loss in coating strength.

TABLE 5

Coating Formulations

| Sample | E | F | G |
|---|---|---|---|
| High Bright #1 Kaolin | 40 | | |
| M07-1061 | | 40 | 40 |
| GCC | 60 | 60 | 60 |
| Dispersant | 0.2 | 0.2 | 0.2 |
| SB Latex | 9.5 | 9.5 | 9.5 |
| Starch | 6.5 | 6.5 | 6.5 |
| Calcium stearate | 1.0 | 1.0 | 1.0 |
| Hollow sphere PP | 5.0 | | |
| Styronal ND 811 | | 4.0 | 3.0 |
| Viscosity | 1000-1400 # 6 spindle 100 rpm | 1000-1400 # 6 spindle 100 rpm | 1000-1400 # 6 spindle 100 rpm |
| Coat weight | 6.4 | 6.4 | 6.4 |
| Gloss Target | 65 | 65 | 65 |

TABLE 6

Paper Test Results

| Sample Key | HS PP | M07-1061 | M07-1061 |
|---|---|---|---|
| Sample Description | 5 parts | 4.0 parts ND 811 | 3.0 parts ND 811 |
| Brookfield Viscosity (cps) 20 rpm | 5120 | 4780 | 4720 |
| Brookfield Viscosity (cps) 100 rpm | 1640 | 1524 | 1520 |
| Hercules Viscosity Apparent at Peak (cps) | 40.5 | 29.2 | 29.2 |
| AA-GWR (g/m²) (2 atm, 2 min.) | 49.1 | 68.6 | 81.2 |
| Sheet Gloss 75° (%) | 63 | 68 | 67 |
| IGT Dry Pick (ft/min) | 363 | 361 | 383 |

Table 6 shows significant improvement in gloss using the combination of M07-1061 without adverse impact on coating strength. Also, as observed in previous examples, the rheology of the coating color was improved and the water retention of all the coatings still remained excellent with the replacement of the plastic pigment.

EXAMPLE 4

Example 4 shows again that a combination of BASF products designated as ND811 and M07-1061 would eliminate the plastic pigment with improvement in performance over just the ND811 or just the M07-1061.

The formulation and the coating color characteristics are shown in Table 8.

TABLE 8

| Sample | 1 | 2 | 3 | 4 |
|---|---|---|---|---|
| High bright # 1 Kaolin | 38 | 38 | | |
| M07-1061 | | | 38 | 38 |
| GCC | 40 | 40 | 40 | 40 |
| Calcined Kaolin | 14 | 14 | 14 | 14 |
| HSPP | 4 | | | |
| ND 811 | | 6 | | 3 |
| Starch | 4 | 4 | 4 | 4 |
| XSB Latex Binder | 12 | 12 | 11 | 11 |
| Dispersant, Thickener, Cross linker and lubricant same amount in both formulations | | | | |
| Solids as is (%) | 59 | 59 | 59 | 59 |
| pH as is | 8.5 | 8.5 | 8.5 | 8.5 |

The coating color was applied to basepaper using the Modern Metalcraft coater. The coated paper was dried, cut into sheets and calendared to target gloss of 70% using standard procedures. Table 9 shows the coated paper properties.

TABLE 9

Paper Properties

| Sample # | 1 | 2 | 3 | 4 |
|---|---|---|---|---|
| Sample Key | # 1 Kaolin with HSPP | #1 Kaolin with ND811 | Only M07-1061 | M07-1061 at ND-811 |
| Sheet Gloss 75° (%) | 71 | 71 | 67 | 71 |
| Brightness (%) | 79 | 79 | 79.6 | 79.4 |
| Opacity (%) | 88.3 | 87.5 | 87.7 | 87.9 |
| Print Gloss 75° (%) | 83 | 79 | 78 | 81 |

The substitution of HSPP with just the ND811 maintains the sheet gloss and the sheet brightness but opacity decreased significantly by 0.8 points and the print gloss decreases by 4 points. On the other hand, substitution of the #1 grade kaolin with an ultrafine kaolin and taking out HSPP leads to decrease in gloss by 4 points and print gloss decrease by 5 points. However, the use of both ND811 and the ultrafine kaolin leads to equal gross, better sheet brightness, marginally lower sheet opacity and print gloss.

In certain embodiments, the monomers and kaolin pigment are added individually or in combination as a blend to the coating or binding formulation.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A paper coating or binding formulation, comprising:
   an aqueous emulsion which comprises a copolymer derived from one or more monomers; and
   an ultrafine kaolin pigment, wherein the copolymer has a glass transition temperature of greater than 30° C.

2. The paper coating or binding formulation according to claim 1, wherein the one or more monomers are selected from the group consisting of styrene, butadiene, vinyl acetate, carboxylic acids, (meth)acrylic acid esters, (meth)acrylamide, and (meth)acrylonitrile.

3. The paper coating or binding formulation according to claim 1, wherein the copolymer is selected from pure acrylic-based copolymers, styrene acrylic-based copolymers, styrene butadiene-based copolymers, and vinyl acrylic-based copolymers.

4. The paper coating or binding formulation according to claim 3, wherein the copolymer comprises a pure acrylic-based copolymer.

5. The paper coating or binding formulation according to claim 1, wherein at least one of the one or more monomers is selected from the group consisting of (meth)acrylic acid, (meth)acrylic acid esters, (meth)acrylamide, (meth)acrylonitrile, and mixtures thereof.

6. The paper coating or binding formulation according to claim 5, wherein the one or more monomers comprise methyl methacrylate and butyl acrylate.

7. The paper coating or binding formulation according to claim 5, wherein the one or more monomers comprise methyl methacrylate and 2-ethyl hexyl acrylate.

8. The paper coating or binding formulation according to claim 5, wherein the one or more monomers further comprise acrylic acid.

9. The paper coating or binding formulation according to claim 1, wherein at least 55% of the kaolin pigment is less than 0.3 μm.

10. The paper coating or binding formulation according to claim 1 wherein the monomers and kaolin pigment are added individually or in combination as a blend to the coating or binding formulation.

11. A paper comprising a fiber matrix and a coating or binding composition comprising:

an aqueous emulsion which comprises a copolymer derived from one or more monomers; and an ultrafine kaolin pigment, wherein the copolymer has a glass transition temperature of greater than 30° C.

12. The paper according to claim 11, wherein the one or more monomers are selected from the group consisting of styrene, butadiene, vinyl acetate, carboxylic acids, (meth)acrylic acid esters, (meth)acrylamide, and (meth)acrylonitrile.

13. The paper according to claim 11, wherein the copolymer is selected from pure acrylic-based copolymers, styrene acrylic-based copolymers, styrene butadiene-based copolymers, and vinyl acrylic-based copolymers.

14. The paper according to claim 13, wherein the copolymer comprises a pure acrylic-based copolymer.

15. The paper according to claim 11, wherein at least one of the one or more monomers is selected from the group consisting of (meth)acrylic acid, (meth)acrylic acid esters, (meth)acrylamide, (meth)acrylonitrile, and mixtures thereof.

16. The paper according to claim 15, wherein the one or more monomers comprise methyl methacrylate and butyl acrylate.

17. The paper according to claim 15, wherein the one or more monomers comprise methyl methacrylate and 2-ethyl hexyl acrylate.

18. The paper according to claim 15, wherein the one or more monomers further comprise acrylic acid.

19. The paper according to claim 11, wherein at least 55% of the kaolin pigment is less than 0.3 μm.

20. The paper according to claim 11, wherein the monomers and kaolin pigment are added individually or in combination as a blend to the coating or binding formulation.

* * * * *